United States Patent [19]

Batakis et al.

[11] Patent Number: 5,119,636
[45] Date of Patent: Jun. 9, 1992

[54] FUEL INJECTOR FOR A TURBINE ENGINE

[75] Inventors: Anthony Batakis; Jack R. Shekleton, both of San Diego, Calif.

[73] Assignee: Sundstrand Corporation, Rockford, Ill.

[21] Appl. No.: 455,509

[22] Filed: Dec. 21, 1989

[51] Int. Cl.⁵ ............................................. F02C 7/228
[52] U.S. Cl. ..................................... 60/739; 60/746
[58] Field of Search ............... 60/734, 739, 740, 741, 60/746

[56] References Cited

U.S. PATENT DOCUMENTS

| | | | |
|---|---|---|---|
| 2,676,461 | 4/1954 | Gove | 60/739 |
| 2,806,354 | 9/1957 | Cook | 60/739 |
| 3,774,851 | 11/1973 | Simmons | 60/739 |
| 4,862,693 | 9/1989 | Batakis et al. | 60/739 |
| 4,918,925 | 4/1990 | Tingle | 60/739 |

Primary Examiner—Louis J. Casaregola
Attorney, Agent, or Firm—Wood, Phillips, Mason, Recktenwald & VanSanten

[57] ABSTRACT

Manifold head effects at low fuel flows in a fuel injected air breathing turbine are minimized by utilizing fuel injectors having fuel injecting tubes (66) with open ends (70) for fuel injection and provided with elongated capillary tubes (88) upstream thereof and connected to receive fuel from a fuel manifold (48) having an inlet (56) while uniform, relatively low velocity fuel exit flow from the ends (70) the injecting tubes (66) is achieved through the use of internal impingement surfaces (96, 102, 106, 110, 124). Pressure loss differences contributing to nonuniform fuel flow and resulting from some fuel injecting tubes (66) be more distant from the manifold inlet (56) are minimized by shortening the length of the capillary tubes (88) furthest from the manifold inlet (56).

5 Claims, 3 Drawing Sheets

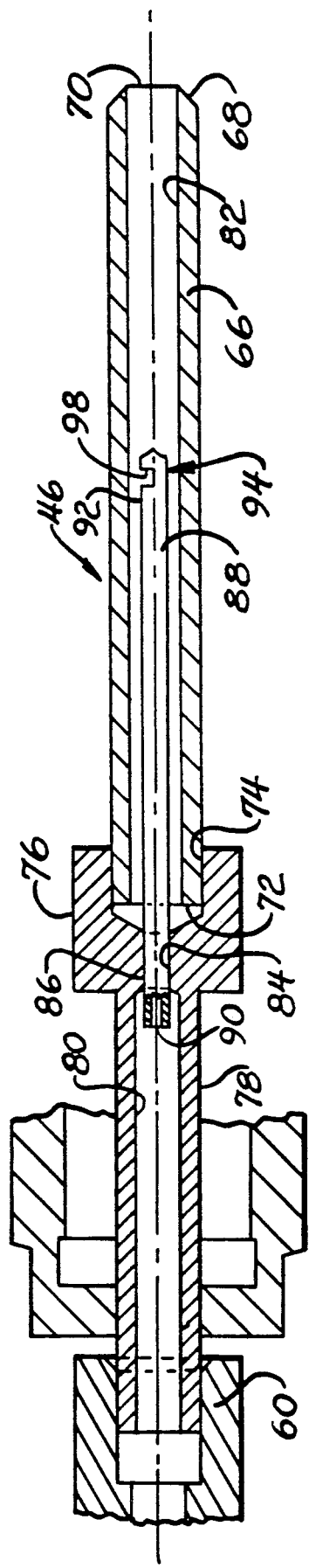
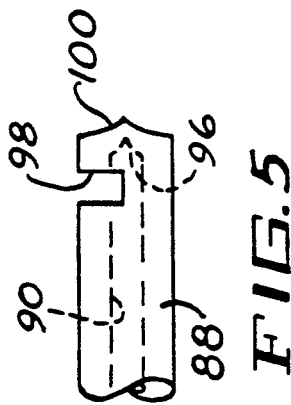
FIG. 4
FIG. 5

5,119,636

FUEL INJECTOR FOR A TURBINE ENGINE

FIELD OF THE INVENTION

This invention relates to turbine engines, and more particularly, to fuel injectors therefor. Specifically, this invention relates to novel fuel injectors which minimize nonuniform fuel injection at low fuel flows resulting from the effects of manifold head.

BACKGROUND OF THE INVENTION

As is well known, turbine engines typically include a rotor and a turbine wheel rotatable about a generally horizontal axis Not infrequently, an annular combustor surrounds the axis and is provided with a plurality of angularly spaced fuel injectors whereby fuel is injected into the combustor to be burned and ultimately directed at the turbine wheel to spin the same. At a location that is usually external of the combustor, a ring-like manifold is utilized as a fuel manifold that interconnects the various fuel injectors.

Because the rotational axis of the compressor and turbine wheel is typically horizontal, the ring-like manifold will be in a vertical plane. This in turn means that the pressure acting on the fuel at the lowermost injectors is greater than the pressure acting on the fuel at the highest injectors as a consequence of gravity acting on the column of fuel within the manifold itself The pressure difference is due to the pressure head created by the vertical column of fuel in the manifold and thus is termed "manifold head".

In many instances, this does not present a problem. However, in turbines of the sort whereat very low fuel flows may be employed as for example, small turbines operating at high altitude, substantial nonuniformity in fuel injection may result. In some cases, it is possible that fuel injection will occur only at the lowermost injectors and not at all at the uppermost ones.

This, in turn, can lead to the development of hot spots within the turbine engine which shortens its life as well as operating inefficiencies because of poor, localized combustion.

In order to overcome the difficulty, it has been proposed to provide each fuel injector or, in some cases, pairs of fuel injectors, with an orifice The orifices then require an increased fuel injecting pressure in order to deliver fuel past the orifice into the combustion chamber and as a consequence, the manifold head pressure at the lower injectors is relatively small compared to the injecting pressure applied to the fuel at all orifices Thus, substantially uniform injection will occur at all injector locations.

The approach is not altogether satisfactory. For one, in order to increase the pressure drop at each fuel injector sufficiently, the orifices must be made to be relatively small. As a consequence, they are prone to clogging. And, of course, when one or more orifices clog, the corresponding fuel injector is blocked and again, the problem of hot spots arises.

In addition, with orifices, the pressure drop across the orifice rises asymptotically in proportion to fuel flow. This in turn means that undesirably high fuel pressures must be utilized to deliver fuel at high flow rates that are desired for some stages of turbine operation.

To avoid these difficulties, in commonly assigned U.S. Pat. No. 4,862,693 issued Sep. 5, 1989 to Batakis et al, the use of capillary tubes is proposed. While the means therein disclosed do solve the above problem, in some instances an even greater degree of uniformity of injection may be desired The present invention is directed to providing the "fine tuning" that achieves a high degree of uniformity of injection.

SUMMARY OF THE INVENTION

It is the principal object of the invention to provide a new and improved fuel injector for an air breathing turbine. It is also an object of the invention to provide a new and improved turbine having a fuel injector system that minimizes non uniform injection that results from manifold head.

An exemplary embodiment of the invention achieves the foregoing object in an air breathing turbine including a rotary compressor, a turbine wheel coupled to the compressor, and a combustor between the compressor and the turbine wheel for receiving compressed air from the compressor and combusting fuel therewith to provide combustion gas to the turbine that drives the same. A plurality of angularly spaced fuel injectors, each having an injection opening within the combustor are provided and a fuel manifold extends about the combustor and is in fluid communication with each of the injectors for delivering fuel thereto. Each of the injectors, upstream of the injection opening, and downstream of the manifold, includes an elongated flow path of capillary cross section By using a capillary passage, the pressure drop across the passage can be controlled by its length, as opposed to the cross section of the same. Thus, an elongated capillary passage may have a substantially larger diameter than an orifice and yet provide the same pressure drop. As a consequence, the capillary passage will be less prone to clogging.

Moreover, it can be shown that at low flow rates in a capillary passage, flow will be in a laminar regimen while at higher flow rates, the flow will be in the turbulent regimen. As a result, the pressure drop is not as great at higher flow rates using the capillary passage as would be the case with an orifice because of the lower losses in the turbulent regimen Thus, a high pressure as required with orifice systems operating at high flow rates need not be employed with the capillary cross section passage.

At the same time, the injection will be at varying distances from the fuel inlet to the manifold, and thus subject to different injection pressures due to differing pressure losses related to the distances between the inlet and the various injectors. The invention contemplates varying the length of the several capillary passages to equalize the flow number relative to each injector and thus achieve a high degree of injection uniformity over a wide range of fuel flows In a preferred embodiment, the flow path is defined by a capillary tube and the injector includes a conduit and each capillary tube is located within the corresponding conduit. By varying the lengths of the various capillary tubes, substantially uniform flow rates may be achieved The invention also contemplates a method of maximizing uniformity of injection of fuel in a multiple injector turbine engine having a manifold with an inlet and provided with capillary passages upstream of the discharge opening of each fuel injector and downstream of the manifold which includes the step of individually sizing the capillary passages so as to achieve a substantial uniform flow number over a range of fuel flows.

In a preferred embodiment, the individual sizing is obtained by means of varying the length of otherwise substantially identical capillary passages Other objects and advantages will become apparent from the following specification taken in connection with the accompanying drawings

DESCRIPTION OF THE DRAWINGS

FIG. 4 is an enlarged, fragmentary sectional view of a preferred embodiment of fuel injector taken approximately along its longitudinal axis;

FIG. 5 is an enlarged, fragmentary view of a tip of a capillary tube used in the injector;

DESCRIPTION OF THE PREFERRED EMBODIMENT

Figure 1:
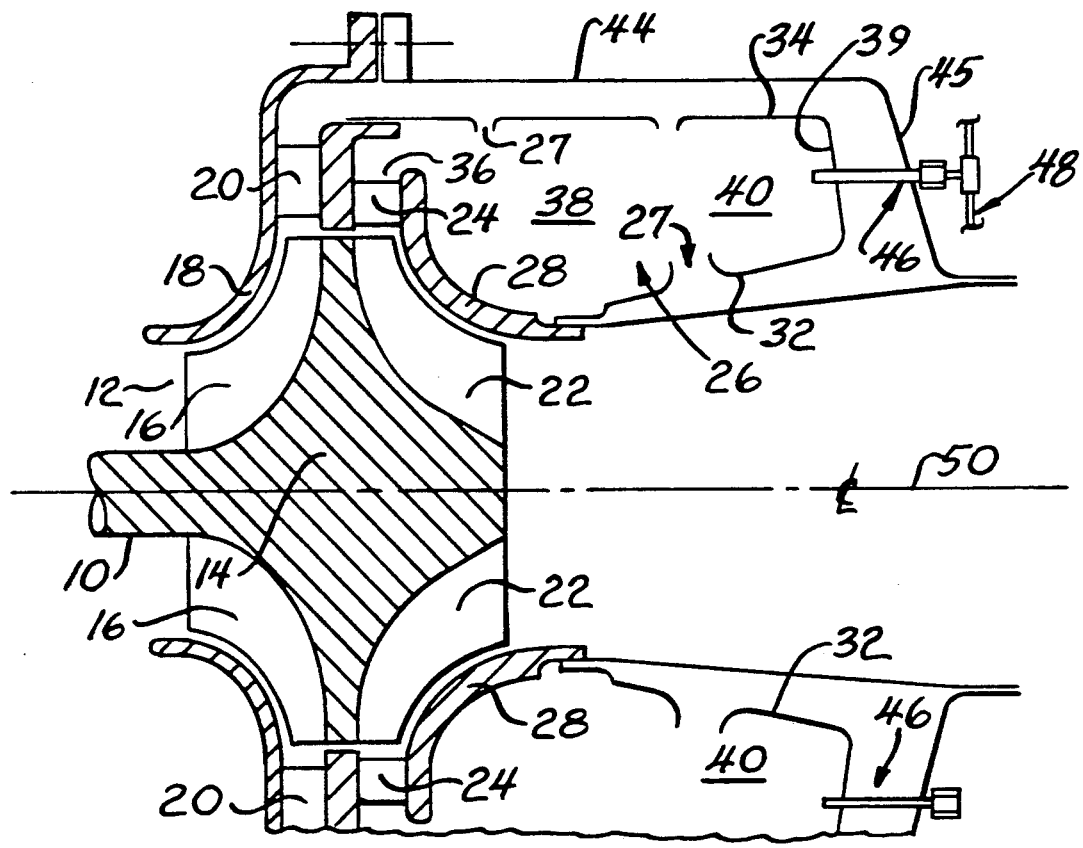
FIG. 1 is a somewhat schematic, sectional view of an air breathing turbine made according to the invention.

An exemplary embodiment of a gas turbine made according to the invention is illustrated in the drawings in the form of a radial flow, air breathing gas turbine However, the invention is not limited to radial flow turbines and may have applicability to any form of air breathing turbine having a plurality of fuel injectors in differing vertical locations with respect to each other during normal operation.

The turbine includes a rotary shaft 10 journaled by bearings not shown. Adjacent one end of the shaft 10 is an inlet area 12. The shaft 10 mounts a rotor, generally designated 14, which may be of conventional construction Accordingly, the same includes a plurality of compressor blades 16 adjacent the inlet 12. A compressor blade shroud 18 is provided in adjacency thereto and just radially outwardly of the radially outer extremities of the compressor blades 18 is a conventional diffuser 20.

Oppositely of the compressor blade 16, the rotor 14 has a plurality of turbine blades 22. Just radially outwardly of the turbine blades 22 is an annular nozzle 24 which is adapted to receive hot gases of combustion from an annular combustor, generally designated 26. The compressor system including the blades 16, shroud 18 and diffuser 20 delivers hot air to the annular combustor 26 and via dilution air passages 27, to the nozzle 24 along with the gases of combustion. That is to say, hot gases of combustion from the combustor are directed via the nozzle 24 against the blades 22 to cause rotation of the rotor, and thus the shaft 10. The latter may be, of course, coupled to some sort of apparatus requiring the performance of useful work.

A turbine blade shroud is interfitted with the combustor 26 to close off the flow path from the nozzle 24 and confine the expanding gas to the area of the turbine blades.

The combustor 26 has a generally cylindrical inner wall 32 and a generally cylindrical outer wall 34. The two are concentric and merge to a necked down area 36 which serves an outlet from an interior annulus 38 of the combustor 26 to the nozzle 24. A third wall 39, generally concentric with the walls 32 and 34, extends generally radially to interconnect the walls 32 and 34 and to further define the annulus 38.

Opposite of the outlet 36 and adjacent the wall 39, the interior annulus 38 of the combustor 26 includes a primary combustion zone 40 in which the burning of fuel primarily occurs. Other combustion may, in some instances, occur downstream from the primary combustion area 40 in the direction of the outlet 36. As mentioned earlier, provision is made for the injection of dilution air through the passages 27 into the combustor 26 downstream of the primary combustion zone to cool the gases of combustion to a temperature suitable for application to the turbine blades 22 by the nozzle 24.

In any event, it will be seen that the primary combustion zone is an annulus or annular space defined by the generally radially inner wall 32, the generally radially outer wall 34 and the wall 39 However, as will be appreciated by those skilled in the art from the following description, the combustor need not be an annular combustor, but could be comprised of a plurality of generally cylindrical combustors, each having an individual fuel injector.

Continuing with the description of FIG. 1, a further wall 44 is generally concentric to the walls 32 and 34 and is located radially outward of the latter. The wall 44 extends to the outlet of the diffuser 20 and thus serves to contain and direct compressed air from the compressor system to the combustor 26. A radially inwardly directed extension 45 of the wall 44 is spaced from the wall 39 to further define the compressed air passage about the combustor 26. Mounted on and extending through the wall 45 as well as the wall 39 are a plurality of air blast fuel injectors, each generally designated 46. That is the injectors 46 rely on the difference in velocity of fuel and surrounding air to provide atomization of the fuel. The injectors 46 are connected to a common manifold, shown fragmentarily at 48 in FIG. 1 and fully in FIGS. 2 and 3. In normal operation of the turbine, the axis of rotation of the shaft 10, designated 50, will normally be horizontal and thus it will be appreciated that the manifold 48 will be in a vertical plane with the injectors 46 directed generally horizontally and axially into the primary combustion area 40.

In the illustrated embodiment, thirteen injectors 46 are equally angularly spaced about the axis of rotation 50 and are connected into one or the other of two legs, 52, 54 of the manifold 48. The two legs 52 and 54 join at a fitting 56 at the normally uppermost part of the manifold 48 and which is intended to be connected to a source of fuel at varying pressures dependent upon a desired fuel flow.

Each leg 52 and 54 of the manifold is comprised of a plurality of sections 58 of tube having the configuration shown and which are joined by tees 60 which additionally mount the injectors 46. Though not shown in FIG. 2, the inside diameter of the tube sections 58 progressively become smaller in each of the legs 52 and 54 as one moves progressively away from the manifold inlet fitting 56 as described more fully in the previously identified Batakis et al patent.

Turning now to FIGS. 4 and 5, a preferred embodiment of an individual injector 46 will be described. Each injector includes an elongated tube 66 having an external chamfer 68 at its end located within the primary combustion zone 40. Within the chamfer end 68 is an injection opening 70.

The opposite end 72 of the tube 66 is received in an enlarged bore 74 in a fitting 76 and may be brazed or otherwise held therein The fitting 76 has an opposite, reduced diameter end 78 which may be of approximately the same diameter as the tube 76 and which extend to the corresponding tees 60 to be connected thereto. The reduced diameter end has an internal bore 80 that is of the same or generally similar diameter as the internal bore 82 in the tube 66.

Interconnecting the bore 74 and the bore 80 and within the fitting 76 is a small bore 84 which mounts one end 86 of a capillary tube 88 The capillary tube 88 has an outside diameter less than the internal diameter of the bores 80 or 82 and an interior passage 90 of capillary size The capillary tube 88 is elongated and at its end 92 opposite the end 86 includes structure, generally designated 94, for abruptly changing the direction of fuel flowing through the interior passage 90 of the capillary tube 88 to direct the same against the interior wall 82 of the fuel injecting tube 66.

As seen in FIGS. 4 and 5, such means 94 include a closed end 96 of the tube 88 and an immediately upstream side opening 98. Thus, fuel flowing within the passage 90 will have its path of flow blocked by the closed end 96 which may act as an impingement surface causing the flow to be directed sideways out of the opening 98 and against the interior wall 82 of the tube 66. This action absorbs a substantial amount of the kinetic energy of the flowing fuel and because of that fact along with the factor that the cross sectional area of the fuel injecting tube 66 is substantially greater than that of the passage 90, there results a uniform, relatively slow velocity fuel exit flow from the injection opening 70.

The low velocity exit flow of the fuel to the air within the combustor will result in a large velocity difference between the air and the fuel which provides for very effective atomization of the fuel, and thus, promotes excellent combustion without the formation of hot spots or elemental carbon.

While the closed end 96 may be formed in any of a variety of ways, a preferred means of forming the same is simply to use a cutting tool of the sort having opposed surfaces which may be moved towards each other to form a crimp 100. The crimp readily seals the passage 90 as well as terminates the end of the capillary tube 88. The opening 96 may be simply formed just upstream of the crimp 100 by notching the sidewall of the capillary tube 88 and only need have a cross sectional area equal to or greater than the cross sectional area of the passage 90.

It bears repeating that the tube 88 is a capillary tube. As used herein, a capillary is one that, for the lowest fuel flow contemplated through a given injector 46, will allow a laminar flow regimen to exist, and yet, at higher fuel flows, will allow a turbulent flow regimen to exist.

As a consequence, because of the laminar flow regimen, at low fuel flows a high pressure drop will exist across fuel being injected by an injector 46 by reason of the presence of the capillary tube 88. This, in turn, means a relatively high pressure in the bore 80 with a relatively lower pressure equal to that within the combustor at the end 70. Conversely, when the flow regimen switches to turbulent flow for higher Reynolds numbers, the friction factor will decrease and a lower pressure drop will exist across the length of the tube 88

Because of the high pressure drops at low flow rates, the pressure differential between uppermost ones of the injectors and lowermost ones of the injectors 46 as a result of the manifold head effect will be small in comparison to the pressure drop across the capillary tubes 88, effectively eliminating the influence of manifold head on injection Conversely, because the pressure drop will decrease as the flow regimen switches to turbulent flow for higher fuel flow rates, the presence of the capillary tubes 88 will not create an intolerably large pressure drop at high fuel flows.

In addition, because an elongated pressure capillary tube 88 is utilized, the same pressure drop that might be obtained out of an orifice can be obtained in a tube having a larger internal diameter. This in turn avoids the problem of clogging that is suffered with orifices that are sufficiently small to minimize the manifold head effect.

The use of the fuel directing means 94 at the end 92 of the capillary tube 88 provides a means of assuring uniform, relatively low velocity fuel exit flow so as to obtain excellent atomization. While the embodiment illustrated in FIGS. 4 and 5 is preferred because of the ease of assembling the same, other embodiments may be used as desired Reference may be made to the commonly assigned application of Batakis et al entitled "Fuel Injector for a Turbine Engine," filed Dec. 20, 1989 and given U.S. Ser. No. 453,612, the details of which are herein incorporated by reference.

Figure 2:
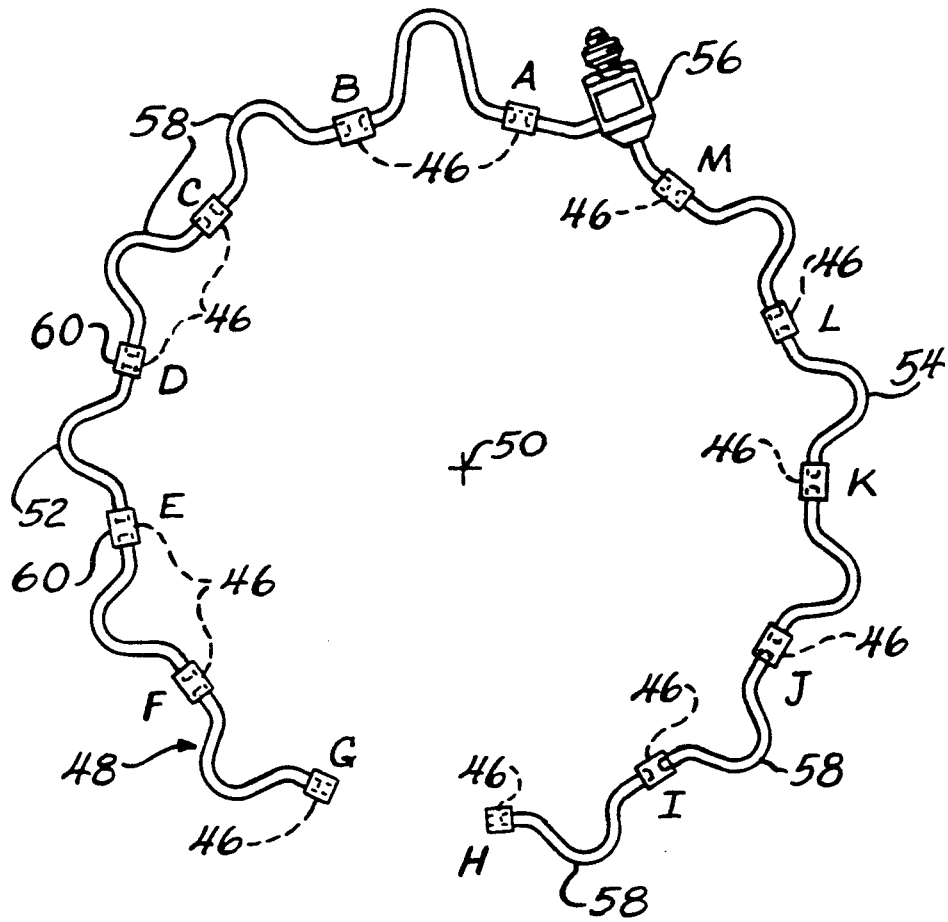
FIG. 2 is a side elevation of a fuel manifold with fuel injectors made according to the invention.
Figure 3:
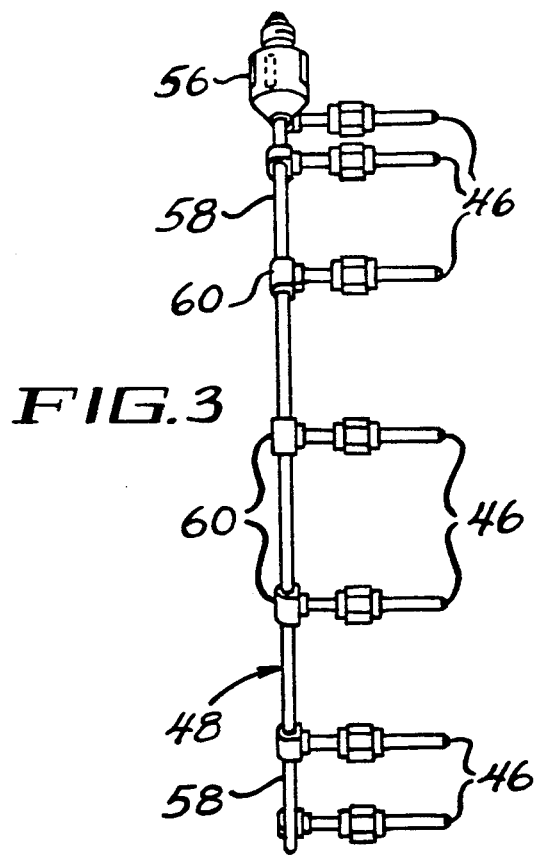
FIG. 3 is a side elevation of the fuel injection manifold and fuel injectors taken at approximately right angles to FIG. 2.

To further promote uniformity of injection, the invention contemplates compensating for the fact that certain of the injectors 46 may be further along the path of fuel flow defined by the manifold 48 than other injectors 46. As a consequence, frictional losses during the flow of fuel from the inlet 56 to more remote ones of the injectors 46 such as those shown at positions G and H in FIG. 2 are greater than the losses occurred in the flow of fuel from the inlet 56 to the injectors 46 at, for example, positions A and M, were all injectors 46 identical one to the other This in turn would result in, for a given pressure at the inlet 56, a greater flow rate out of the injectors 46 at positions A and M than at the injectors 46 at positions G and H because of the lesser frictional losses To avoid this difficulty, the invention contemplates equalizing, as nearly as possible, the frictional losses from the inlet 56 to any given injector 46 regardless of its relative distance from the inlet 56 with respect to other injectors. More particularly, while frictional losses will obviously be related to the configuration of the legs 52 and 54 as well as the diameters of the tube sections 58 making up the same, as will be readily apparent from the foregoing discussion, a substantial influence on flow resistance, and thus frictional losses, is provided by the capillary tubes 88 forming part of each of the injectors 46.

By making the length of the capillary tubes 88 associated with the injectors 46 closer to the inlet 56 along the length of the manifold 48 longer than those capillary tubes associated with the injectors 46 more remote from the inlet 56, equalization can be obtained That is to say, because one factor in the resistance to flow provided by any conduit is related to the length of the conduit, by appropriately selecting the length of the capillary tubes 88 through which all fuel in the system must flow, flow equalization may be obtained.

According to the invention then, applicant strives to achieve the same flow number at each of the injectors in a system where the location of the injectors with respect to the inlet and along the manifold flow path varies Flow number is defined as the actual flow rate divided by the square root of the pressure differential or pressure drop across the corresponding injector.

In general terms, this is achieved, as mentioned previously, by progressively reducing the length of the capillary tubes as one progresses away from the inlet along the manifold This may be easily accomplished simply by trimming each tube 88 to the desired length Typically, the trimming will be performed on the ends 86 thereby allowing the position of the ends 92 of the tubes 88 to remain fixed with relation to the fuel injection tubes 66

The following table sets forth a plot of the length of the flow path of each capillary tube 88 for each injector 46 in each of the positions A–M inclusive as illustrated in FIG. 2 verses the percent difference in flow rate at a variety of fuel flows. The capillary length is given in inches and the fuel flows are given in pounds per hour. As can be seen, the range in the difference in fuel flow from the injector providing the least fuel flow to that providing the most over a widely varying fuel flow range in excess of one order of magnitude, i.e., 14 pounds per hour up to 380 pounds per hour, is surprisingly low. The table is as follows:

THE CAPILLARY TUBE FUEL MANIFOLD

| POSITION | LENGTH (in) | 380 PPH (147 PSI) | 300 PPH (95 PSI) | 250 PPH (68 PSI) | 200 PPH (46 PSI) | 150 PPH (28 PSI) | 100 PPH (12 PSI) | 30 PPH (3.5 PSI) | 14 PPH |
|---|---|---|---|---|---|---|---|---|---|
| A | 1.903 | 98 | 98 | 98 | 98 | 98 | 96 | 100 | 100 |
| B | 1.895 | 97 | 97 | 98 | 98 | 98 | 96 | 99 | 97 |
| C | 1.843 | 97 | 98 | 98 | 98 | 97 | 95 | 99 | 97 |
| D | 1.808 | 97 | 97 | 98 | 97 | 97 | 95 | 99 | 96 |
| E | 1.770 | 97 | 98 | 98 | 98 | 97 | 94 | 98 | 93 |
| F | 1.648 | 97 | 98 | 98 | 97 | 97 | 93 | 98 | 95 |
| G | 1.646 | 98 | 99 | 99 | 98 | 97 | 94 | 96 | 95 |
| H | 1.812 | 99 | 99 | 99 | 98 | 98 | 94 | 95 | 92 |
| I | 1.831 | 96 | 97 | 97 | 96 | 96 | 94 | 99 | 94 |
| J | 1.955 | 98 | 99 | 99 | 98 | 98 | 95 | 96 | 94 |
| K | 1.959 | 96 | 97 | 97 | 97 | 96 | 95 | 97 | 95 |
| L | 1.968 | 95 | 96 | 96 | 96 | 95 | 94 | 97 | 94 |
| M | 2.008 | 100 | 100 | 100 | 100 | 100 | 100 | 99 | 98 |
| % DIFF. |  | 5% | 4% | 4% | 4% | 5% | 7% | 5% | 8% |

From the foregoing, it will be readily appreciated that the use of capillary passages whose length is varied depended upon the relative position with respect to the inlet to a manifold from which fuel is received not only provides excellent compensation for the effects of so-called "manifold head," but also compensates for unequal pressure drops between the manifold inlet and the upstream side of each injector to achieve uniformity of flow.

What is claimed is:

1. An air breathing turbine comprising:
a rotary compressor;
a turbine wheel coupled to said compressor;
a combustor between said compressor and said turbine wheel for receiving compressed air from said compressor and combusting fuel therewith to provide combustion gas to said turbine to drive the same;
a plurality of angularly spaced fuel injectors each having an injector opening within said combustor; and
a fuel manifold extending about said combustor and in fluid communication with each of said injectors for delivering fuel thereto;
an inlet to said manifold and located such that some of said injectors are at different distances from said inlet than other injectors; and
separate means for each said injector for defining an elongated flow path of capillary cross section for the corresponding injector and located upstream of the injector opening thereof and downstream of said manifold;
the capillary flow path means progressively further from said manifold inlet along said flow path having generally progressively less resistance to fuel flow than those closer to said manifold inlet.

2. The air breathing turbine of claim 1 wherein the capillary passages progressively further from said manifold inlet along said flow path achieve generally progressively less resistance to fuel flow by being of progressively shorter length.

3. An air breathing turbine comprising:
a rotary compressor;
a turbine wheel coupled to said compressor;
a combustor between said compressor and said turbine wheel for receiving compressed air from said compressor and combusting fuel therewith to provide combustion gas to said turbine to drive the same;
a plurality of fuel injecting tubes having angularly spaced, open ends within said combustor, said open ends defining fuel injecting openings, and elongated capillary tubes within each tube through which all fuel must pass prior to reaching the corresponding one of said openings said capillary tubes serving to minimize non uniform fuel injection at low fuel flows as a result of the effects of manifold head while allowing injection at high fuel flows without undesirably high pressure drops;
a fuel manifold in fluid communication with each of said fuel injecting tubes upstream of said capillary tubes and for delivering fuel thereto; and
an inlet to said fuel manifold;
the capillary tubes associated with the fuel injecting tubes furthest from said inlet having lesser lengths than those associated with the fuel injecting tubes nearest said inlet.

4. The air breathing turbine of claim 3 further including fuel impingement surface within each said injecting tube.

5. The air breathing turbine of claim 3 wherein said fuel manifold has a pair of legs with said inlet generally centrally of said legs; and each of said leg includes a plurality of said fuel injecting tubes and associated capillary tubes; the lengths of the capillary tubes associated with each said leg progressively decreasing as the distance along the corresponding leg from the inlet increases.

* * * * *